(12) United States Patent
Orologio

(10) Patent No.: US 10,112,364 B2
(45) Date of Patent: Oct. 30, 2018

(54) THERMALLY INSULATED PERSONAL ARTICLE AND SLEEPING BAG LINERS

(71) Applicant: Furio Orologio, Etobicoke (CA)

(72) Inventor: Furio Orologio, Etobicoke (CA)

( * ) Notice: Subject to any disclaimer, the term of this patent is extended or adjusted under 35 U.S.C. 154(b) by 0 days.

(21) Appl. No.: 15/462,008

(22) Filed: Mar. 17, 2017

(65) Prior Publication Data

US 2017/0182733 A1   Jun. 29, 2017

(30) Foreign Application Priority Data

Sep. 19, 2014 (CA) ........................................ 2864232
Oct. 3, 2014 (CA) ...................................... 2866654

(51) Int. Cl.
| | |
|---|---|
| *B32B 3/24* | (2006.01) |
| *B32B 3/26* | (2006.01) |
| *B32B 5/18* | (2006.01) |
| *B32B 5/02* | (2006.01) |
| *B32B 27/08* | (2006.01) |

(Continued)

(52) U.S. Cl.
CPC ................ *B32B 3/266* (2013.01); *A41D 1/04* (2013.01); *A41D 1/06* (2013.01); *A41D 1/22* (2013.01); *A41D 3/00* (2013.01); *A41D 19/0006* (2013.01); *A41D 19/01529* (2013.01); *A41D 31/0038* (2013.01); *A42B 1/069* (2013.01); *A43B 3/02* (2013.01); *A43B 7/34* (2013.01); *A47G 9/086* (2013.01); *B32B 5/028* (2013.01); *B32B 5/18* (2013.01); *B32B 27/08* (2013.01); *A41D 2400/10* (2013.01); *A41D 2400/62* (2013.01); *B32B 2255/102* (2013.01); *B32B 2266/0228* (2013.01); *B32B 2266/08* (2013.01); *B32B 2307/304* (2013.01); *B32B 2307/416* (2013.01);

(Continued)

(58) Field of Classification Search
CPC ....................................................... B32B 3/266
USPC ........................................ 428/133, 137, 166
See application file for complete search history.

(56) References Cited

U.S. PATENT DOCUMENTS

| 3,577,305 A | 5/1971 | Engle et al. |
|---|---|---|
| 4,685,155 A | 8/1987 | Fingerhut et al. |

(Continued)

FOREIGN PATENT DOCUMENTS

| CA | 2218282 A1 | 6/1999 |
|---|---|---|
| CA | 2554754 | 12/2007 |

(Continued)

OTHER PUBLICATIONS

CA 2,923,128: Canadian Examiner Report dated Jun. 22, 2016 (4 Pages).

(Continued)

*Primary Examiner* — William P Watkins, III
(74) *Attorney, Agent, or Firm* — Greer, Burns & Crain, Ltd.

(57) ABSTRACT

An article having an inner article layer and an outer article layer to be worn by a mammal comprising a thermally insulating layer of a reflective metalized polymeric insulation material having moisture vapour transference properties adjacent to at least one of the inner and outer article layers. An apparatus and method for producing a reflective metalized polymeric thermally insulating assembly having moisture vapour transference properties suitable for use in the article is also provided. The insulation material provides enhanced thermal retention.

26 Claims, 12 Drawing Sheets

(51) Int. Cl.
  *A41D 1/04* (2006.01)
  *A41D 3/00* (2006.01)
  *A41D 1/06* (2006.01)
  *A41D 1/22* (2018.01)
  *A43B 3/02* (2006.01)
  *A41D 19/015* (2006.01)
  *A41D 31/00* (2006.01)
  *A42B 1/06* (2006.01)
  *A43B 7/34* (2006.01)
  *A41D 19/00* (2006.01)
  *A47G 9/08* (2006.01)

(52) U.S. Cl.
  CPC ..... *B32B 2307/724* (2013.01); *B32B 2437/00* (2013.01)

(56) References Cited

U.S. PATENT DOCUMENTS

| | | | |
|---|---|---|---|
| 5,787,502 A * | 8/1998 | Middleton | A41D 31/0038 2/2.15 |
| 6,191,221 B1 | 2/2001 | McAmish et al. | |
| 6,322,873 B1 | 11/2001 | Orologio | |
| 6,562,439 B2 | 5/2003 | Orologio | |
| 2004/0159011 A1 | 8/2004 | Gordon | |
| 2006/0057918 A1 | 3/2006 | Burnett | |
| 2006/0135019 A1 | 6/2006 | Russell et al. | |
| 2007/0245664 A1 | 10/2007 | Orologio | |
| 2011/0131700 A1 | 6/2011 | Tsui et al. | |
| 2011/0203028 A1 | 8/2011 | Orologio | |
| 2013/0216774 A1 | 8/2013 | Conolly et al. | |

FOREIGN PATENT DOCUMENTS

| | | |
|---|---|---|
| CA | 2923128 C | 2/2017 |
| EP | 1974619 A1 | 10/2008 |
| GB | 2346581 | 8/2000 |
| GB | 2501053 | 10/2013 |
| WO | WO 95/22262 A1 | 8/1995 |
| WO | 2005099496 A2 | 10/2005 |
| WO | 2006026728 A2 | 3/2006 |

OTHER PUBLICATIONS

CA 2,923,128: Response to Canadian Examiner Report dated Jun. 22, 2016 (30 Pages).
CA 2,923,128: Canadian Examiner Report dated Sep. 23, 2016 (3 Pages).
CA 2,923,128: Response to Canadian Examiner Report dated Sep. 23, 2016 (5 Pages).
PCT/CA2015/050921: International Search Report dated Nov. 16, 2015 (6 pages).
PCT/CA2015/050921: Transmittal of International Search Report and Written Opinion dated Nov. 16, 2015 (1 Page).
PCT/CA2015/050921: Written Opinion dated Nov. 16, 2015 (7 pages).
EP Application No. 15841363.3, Extended European Search Report, dated Oct. 25, 2017 (7 pages).

\* cited by examiner

THERMALLY INSULATED PERSONAL ARTICLE AND SLEEPING BAG LINERS

RELATED APPLICATIONS

The present application is a continuation of International Patent Application serial number PCT/CA2015/050921 entitled "THERMALLY INSULATED PERSONAL ARTICLE AND SLEEPING BAG LINERS", filed Sep. 18, 2015 which in turn claims benefit of priority to Canadian Patent Application serial number 2,864,232 entitled "THERMALLY INSULATED PERSONAL ARTICLE", filed Sep. 19, 2014, and to Canadian Patent Application serial number 2,866,654 entitled "THERMALLY INSULATED PERSONAL ARTICLE", filed Oct. 3, 2014, each of the above patent applications being incorporated herein by reference in its entirety.

FIELD OF THE DISCLOSURE

This invention relates to thermally insulated articles worn by a mammal, particularly human beings, and particularly to articles of clothing, footwear and sleeping bags including an insulative layer and an apparatus and method for forming such an insulative layer.

BACKGROUND

Apparel, footwear and insulative casing, such as sleeping bags, worn or used by mammals, particularly human beings, are typically thermally insulated by means of a thick or a plurality of wool or other fabric layers per se or insulative foam, wool or other fabric material between an inner lining and the outer skin of cloth making up the jacket, trousers, coats, sleeping bags and the like.

At present, satisfactory insulated apparel in cold or very cold environments generally needs to be bulky in order to provide a satisfactory comfort level.

There is, however, a need to provide thermally insulated clothing that provides satisfactory thermal insulation that is not relatively bulky.

Reflective metal polymeric insulation materials are known in the construction industry, particularly for use in residential, commercial, and industrial buildings and establishments, wherein the insulation material is adjacent frame structures, walls, crawl spaces, ceilings, around water heaters and pipes and under concrete floors and roads. Examples of such uses are disclosed in U.S. Pat. No. 6,322,873—issued Nov. 27, 2001 to Orologio, Furio and U.S. Pat. No. 6,562,439—issued May 13, 2003 to Orologio, Furio; and Canadian Patent No. 2,554,754—issued Dec. 4, 2007 to Orologio, Furio.

International Patent Application serial number PCT/US2005/031197, entitled "Heat-Reflective Nonwoven Liner Material", filed Aug. 30, 2004 and published to Russell, Robert D., et al. describes a heat reflective garment with an interlining laminate metalized garment fabric which includes a continuous filament nonwoven layer and metalized thermoplastic film layer. The continuous filament nonwoven layer is formed from a thermoplastic polymer and is affixed to the metalized thermoplastic film layer by a lamination process. In some instances the continuous filament nonwoven layer may include surface projections or apertures, however there are no perforations in the metalized thermoplastic layer.

U.S. Pat. No. 6,191,221, entitled "Breathable Film Compositions and Articles and Method", issued Feb. 20, 2001 to McAmish, Larry, et al., describes a breathable film that can be extruded onto a substrate such as a porous fabric. Such breathable films consist essentially of blends of a high moisture vapour transmission rate thermoplastic and a low moisture vapour transmission rate thermoplastic. The blending of the two thermoplastics allows for the varying of the ratios between the two so as to produce a film having the desired moisture vapour transmission rate.

International Patent Application serial number PCT/GB2005/001432, entitled "Articles of Clothing" filed Apr. 14, 2005 and published to Lloyd, David describes an article of clothing comprising an insulating layer portion which comprises a section of bubble wrap material made from latex rubber in which there are a plurality of trapped bubbles of gas sandwiched between a layer of an absorbent material and a waterproof layer.

European Patent Application serial number 1 974 619 entitled "Material for Underwater Suit and Underwater Suit Making Use of the Same", filed Aug. 30, 2005 to Yamamoto, Tomizo describes a material for underwater suits comprising an elastic foam layer, such as neoprene, having a plurality of recesses formed on one side thereof. The plurality of recesses are intended to be directed towards a wearer's body when formed into a suit for underwater use. Another layer, the coating layer, is provided on the elastic layer so as to cover the recesses and provide heat-retaining and buoyancy properties to the material. On the opposing side, the elastic layer is laminated to a stretchable fabric. In some embodiments, a metal foil layer is also added to be formed in the material or fabric.

Canadian Patent Application serial number 2,218,282, filed Dec. 12, 2003 to Perron, Maurice describes clothing having an insulating layer. The insulating layer is formed of a bubble-wrap layer sandwiched between a layer of aluminum film on each side thereof. In such an arrangement, the reflective side of the aluminum foil is provided facing away from the bubble-wrap layer and a layer of a textile is provided onto the aluminum foil layers.

U.S. Patent Application Publication number US 2004/0159011, entitled "Thermal Foot Cover", filed Feb. 12, 2004 to Gordon, Dave describes a thermal foot cover to be worn when the wearer's foot is subjected to cold temperatures. An outer covering is provided which has a radiant barrier on the inside thereof disposed towards the wearer's foot. The radiant barrier is made of a metalized flexible polymeric material where the metalized flexible polymeric material is a bubble-pack material sandwiched between two sheets of aluminum foil.

SUMMARY

Although the use of insulating materials composed of a bubble layer having "air-pockets" containing a gas having adhered thereto a metal foil or metalized layer are known, there are certain drawbacks. For example, in the pursuit to retain heat inside a garment using such a metal foil or metalized bubble-pack insulative material the user often perspires which can lead to moisture build-up inside the garment and thus causing the wearer to become damp and cold in certain conditions. The instant invention provides metal foil or metalized insulative bubble-pack materials which allows the transmission of moisture vapour from the inside of a garment including a metal foil or metalized bubble-pack insulative layer to escape while inhibiting moisture and/or air exterior to the garment to enter. The invention also provides an apparatus and a method to produce such a metal foil or metalized bubble-pack insulative material having moisture transference properties. In another aspect the invention provides insulative bubble-pack materials wherein the transference of moisture vapour is substantially in one direction.

As used herein with reference to the invention, the term 'metalized' includes, but is not so limited to metals in the form of a foil and to particulate metals deposited by vapour or from solution.

The following presents a simplified summary of the general inventive concept herein to provide a basic understanding of some aspects of the invention. This summary is not an extensive overview of the invention. It is not intended to restrict key or critical elements of the invention or to delineate the scope of the invention beyond that explicitly or implicitly described by the following description and claims.

The present invention provides articles to be worn by a person in the form of apparel or clothing, such as, for example, jackets, coats, trousers, headgear, hats, toques, muffs and gloves, as well as boots and shoes, insulative casings, sleeping bags and the like, insulated with a layer of a reflective metal foil or metalized polymeric insulating material. The articles to be worn, for example, include garments with a reflective metal foil or metalized insulating layer including a plurality of apertures for allowing the transference of moisture from inside the garment to escape to the exterior of the garment. Furthermore, the apertures allow the moisture to escape the garment, while substantially inhibiting the passage of moisture and external air from entering the garment across the insulated layer from exterior the garment.

The layer of insulating material may be adhered, sewn or otherwise suitably affixed within or to the inner and/or outer layers of the article Accordingly, in one aspect, the instant disclosure provides an article having an inner article layer and an outer article layer to be worn by a mammal comprising a thermally insulating layer of a reflective metal foil or metalized polymeric insulation material adjacent to at least one of said inner and outer article layers wherein the reflective metal foil or metalized polymeric insulation material includes a plurality of one-way moisture transference apertures provided in an effective array, size, number and suitable location so as to effect expulsion of moisture vapour through the apertures from the inside of the article without ingress of external air through the apertures. The reflective polymeric insulation material may be characterized in having a plurality of apertures where the apertures are suitably sized and located so as to allow transference of moisture vapour through the apertures from interior the article without the ingress of external air through the apertures. The apertures may be frusto-conically shaped wherein the narrower dimension is orientated distal the mammal, in use. Therefore the apertures allow substantially one-way moisture vapour transference.

Preferably, the disclosure provides an article as hereinabove defined, being in general an article of apparel, a hat, a toque, muffs, gloves, boots, shoes, sleeping bags and liners for sleeping bags.

Preferably, the apparel is a coat, trousers, vest, a waistcoat or a dress.

Preferably, the insulation material comprises a foam material wherein the foam material is a closed cell foam, polyethylene foam, polypropylene foam and expanded polystyrene foam, multi-film layered assembly, or a bubble pack.

Preferably, the disclosure provides an article wherein the reflective metal foil or metalized polymeric insulation material comprises a first thermoplastic film having a plurality of portions wherein each of said portions defines a cavity; a second thermoplastic film in sealed engagement with said first film to provide a plurality of closed said cavities. Furthermore, the invention provides a plurality of apertures interposed between said plurality of closed cavities. In some embodiments, the invention also provides that the plurality of apertures may be formed through the closed cavities. Therefore, a radiant barrier is provided.

In further preferred embodiments, the invention provides an article comprising a reflective metal foil or metalized polymeric thermally insulating assembly or radiant barrier having:
(i) a first bubble pack having a first thermoplastic film having a plurality of portions wherein each of said portions defines a cavity and a second thermoplastic film in sealed engagement with said first film to provide a plurality of closed said cavities; and
(ii) a second bubble-pack having a third thermoplastic film having a plurality of portions wherein each of said portions defines a cavity and a fourth thermoplastic film in sealed engagement with said third film to provide a plurality of closed said cavities;
(iii) a metal foil or metalized layer or metalized thermoplastic film interposed between and bonded to said first bubble pack and said second bubble pack; and
(iv) a plurality of substantially one-way moisture vapour transference apertures interposed between said cavities and/or through said cavities, and across said metal foil or metalized layer or metalized thermoplastic film.

In further embodiments, the reflective metal foil or metalized polymeric insulation material comprises an assembly including a first reflective metal foil or metalized bubble pack and a second reflective metal foil or metalized bubble pack having a first plurality of intervening bubble spacers suitably located between said first and said second bubble packs so as to define at least one inner insulative air chamber between said first and second bubble packs. At least one insulative air chamber aperture is provided for permitting the transference of moisture vapour across the insulative air chamber in substantially one direction. Furthermore, the insulative air chamber aperture may be frusto-conically shaped. Therefore, providing a radiant barrier.

The thickness and location of the insulative layer may be selected dependent on the particular article. A thickness of the insulative layer material for the inside of an overcoat or a sleeping bag, between the inner lining and outer cloth, such as, wool, or a waterproof outer layer, for example, may be selected according to the intended application use and environment where the article may be worn by a user.

The insulation material, preferably, may be suitably sewn or adhered by an adhesion mechanism as is desired.

In another aspect of the disclosure, there is provided an apparatus for forming a reflective metal foil or metalized polymeric thermally insulating assembly or radiant barrier having moisture vapour transference properties. The apparatus comprises an endless movable conveyor mold having surfaces defining cavities for receiving therein a first film of thermoplastic material and a heater for heating the first film to a temperature just below a melting temperature thereof. A vacuum inlet is also provided in each cavity for pulling a portion of the first film into each cavity. A first nip roller for melding and bonding a second film of a thermoplastic material in a layered arrangement to the first film so as to form bubbles and melding and bonding a first metal foil or metalized polyester sheet to the second film is provided. Additionally, a second nip roller for melding and bonding a third film of thermoplastic material, having melded and bonded thereto a second metal foil or metalized polyester sheet, to the bubbles so as to form a metal foil or metalized polymeric cavity-filled bubble insulation is provided. In order to provide apertures in the spaces interposed between the bubbles and/or through the bubbles, an aperture forming roller having a plurality of projections for piercing the metal foil or metalized polymeric cavity-filled bubble insulation located about the periphery is also provided.

With reference to the apparatus noted above, the endless movable conveyor mold and the aperture forming roller are synchronized such that the projections pierce only the desired areas, either through the spaces interposed between the bubbles and/or through the bubbles, so as to provide a desired number and array of apertures per given unit area of thermally insulating metal foil or metalized bubble-pack.

The projections may be heated or non-heated. Preferably, the projections are needle-like in shape so as to form frusto-conically shaped apertures.

In another aspect of the disclosure there is provided a method for forming a reflective metal foil or metalized polymeric thermally insulating assembly or radiant barrier having moisture vapour transference properties. The method including:

providing an endless movable conveyor mold having surfaces defining cavities, placing a first film of thermoplastic material on the mold;

heating the first film to a temperature just below a melting temperature thereof, providing a vacuum at each cavity to pull the film into each cavity;

providing a second film of thermoplastic material in a layered arrangement onto the first film;

providing a first metal foil or metalized polyester sheet in a layered arrangement onto the second film;

melding and bonding the second film to the first film to form bubbles and melding and bonding the first metal foil or metalized polyester sheet to the second film;

providing and heating a third film of thermoplastic material and a second metal foil or metalized polyester sheet melded and bonded together;

melding and bonding the third film to the bubbles so as to form a metal foil or metalized polymeric cavity-filled bubble insulation; and forming apertures through at least some of the spaces interposed between the bubbles and/or through a portion of the bubbles.

The method preferably includes heating and pressing second film to the first film and the second film to the first metal foil or metalized polyester sheet and the bubbles formed in the first film to the third film so as to effect bonding and melding. Furthermore, the apertures are formed at locations interposed between the bubbles and/or through the bubbles with a heated or non-heated projection. Preferably, the apertures are frusto-conically formed by piercing the reflective metal foil or metalized polymeric thermally insulating assembly with a needle-like projection.

In yet another aspect of the disclosure, there is provided a thermally insulative casing for surrounding a mammal or part thereof comprising a first rectangular portion and a second rectangular portion. The first rectangular portion and the second rectangular portion comprise a reflective metal polymeric bubble pack insulation assembly having a plurality of bubbles or a reflective metal multilayer film insulation assembly.

In some embodiments, the bubbles of the first rectangular portion are larger in diameter than bubbles of the second rectangular portion. For example, the bubbles of the first rectangular portion may have diameter of greater than $\frac{1}{2}$" and a height of greater than $\frac{3}{16}$" and the bubbles of the second rectangular portion have a diameter of less than $\frac{1}{2}$" and a height of less than $\frac{3}{16}$". Preferably, the bubbles of the first rectangular portion have a diameter of about 1" and a height of about $\frac{1}{2}$" and the bubbles of the second rectangular portion have a diameter of about $\frac{1}{4}$" and a height of about $\frac{3}{16}$".

In some embodiments, the first rectangular portion and second rectangular portion may be integrally formed. In further embodiments, the first rectangular portion and the second rectangular portion may be adjacently joined to one another and in some instances an insulating medium may be provided between the first rectangular portion and the second rectangular portion.

In some embodiments, either one of the first rectangular portion or the second rectangular portion may be made breathable or in other words, moisture vapour pervious.

In some embodiments, the thermally insulative casing may be provided as liner for a sleeping bag. In further embodiments, the thermally insulative casing may be suitably retained in a rectangular enclosure. For example, the rectangular enclosure may be a sleeping bag.

In preferred embodiments, the first rectangular portion constitutes a lower portion, and the second rectangular portion constitutes an upper portion, the lower portion being oriented towards the ground in use of the thermally insulative casing. In such embodiments, the upper portion is characterized in having a plurality of apertures where the apertures are suitably sized and located so as to effect transference of moisture vapour through the apertures from interior the thermally insulative casing without ingress of external air through the apertures. Additionally, in preferred embodiments, the apertures are provided in an effective number and array so as to allow effective moisture vapour transference. Furthermore, in preferred embodiments, the apertures are frusto-conically shaped, having the narrower dimension oriented distal the mammal. In still further preferred embodiments, a reflective side of the reflective metal polymeric bubble pack insulation assembly or the reflective metal multilayer film insulation assembly is oriented to face the interior of the thermally insulative casing.

In some embodiments of the thermally insulative casing the reflective metal polymeric bubble pack insulation assembly comprises a first thermoplastic film having a plurality of portions wherein each of the portions defines a cavity; a second thermoplastic film in sealed engagement with the first film to provide a plurality of closed the cavities and wherein the apertures are interposed between the closed cavities, or, in some embodiments, the apertures may be formed through a portion of the cavities. In other embodiments, the reflective metal polymeric bubble pack insulation assembly comprises a first reflective metal polymeric bubble pack; a second reflective metal polymeric bubble pack; and a first plurality of intervening bubble spacers suitably located between the first and the second reflective metal polymeric bubble packs so as to define at least one inner insulative air chamber between the first and second reflective metal polymeric bubble packs. In embodiments comprising intervening bubble spacers, the reflective metal polymeric bubble pack insulation assembly further includes at least one insulative air chamber aperture for permitting the transference of moisture vapour across the at least one inner insulative air chamber.

In still further embodiments of the thermally insulative casing, the reflective metal polymeric bubble pack insulation assembly comprises a bubble pack assembly having:

(i) a first bubble pack having a first thermoplastic film having a plurality of portions wherein each of the portions defines a cavity and a second thermoplastic film in sealed engagement with the first film to provide a plurality of closed the cavities; and (ii) a second bubble-pack having a third thermoplastic film having a plurality of portions wherein each of the portions defines a cavity and a fourth thermoplastic film in sealed engagement with the third film to provide a plurality of closed the cavities; and (iii) a metal layer or metalized thermoplastic film interposed between and bonded to the first bubble pack and the second bubble pack; and (iv) the plurality of apertures interposed between the cavities and/or through the cavities and across the metal layer or metalized thermoplastic film.

In preferred embodiments of the thermally insulative casing, a fabric mesh layer lining the interior of the thermally insulative casing is provided.

In still yet another aspect of the disclosure there is provided a sleeping bag comprising the thermally insulative casing as herein disclosed where the sleeping bag has an outer fabric layer covering the thermally insulative casing. In some embodiments, a thermal insulation layer is provided and located between the outer fabric layer and the thermally insulative casing. The thermal insulation may be provided as a down insulation, a polymeric fibre insulation, a fleece insulation, a natural fibre insulation or a glass fibre insulation.

In another accept, there is provided an article having an inner article layer and an outer article layer to be worn by a mammal comprising a thermally insulating layer of a reflective metalized polymeric insulation material adjacent to at least one of said inner and outer article layers. The reflective metalized polymeric insulation material comprises a first bubble pack assembly including a first thermoplastic film having a plurality of portions wherein each of said portions defines a cavity and a second thermoplastic film in sealed engagement with said first film to provide a plurality of closed said cavities. The reflective metalized polymeric insulation material is further characterized in having a plurality of apertures suitably sized and interposed between the closed cavities so as to effect transference of moisture vapour through the apertures from interior the article without substantial ingress of external air through the apertures.

In yet another aspect, a thermally insulative casing for surrounding a mammal or part thereof comprising a first rectangular portion and a second rectangular portion is provided. The first rectangular portion and the second rectangular portion each comprised a reflective metal polymeric bubble pack insulation. The reflective metal polymeric bubble pack insulation includes a first thermoplastic film having a plurality of portions wherein each of the portions defines a cavity and a second thermoplastic film in sealed engagement with said first film to provide a plurality of closed the cavities. At least one of the first rectangular portion or the second rectangular portion is further characterized in having a plurality of apertures suitably sized and interposed between the closed cavities so as to effect transference of moisture vapour through the apertures from interior the thermally insulative casing without substantial ingress of external air through the apertures.

In some embodiments, the apertures are also formed through a portion of the closed cavities.

Furthermore, in some embodiments, the reflective metalized polymeric insulation material further includes a foam material layer wherein the foam material is a closed cell foam, a polyethylene foam, a polypropylene foam, an expanded polystyrene foam, a multi-film layered assembly layer, or a multi-layer bubble pack assembly.

BRIEF DESCRIPTION OF THE DRAWINGS

In order that the invention may be better understood, preferred embodiments will now be described by way of example only, with references to the accompanying drawings wherein.

DETAILED DESCRIPTION

Figure 1:
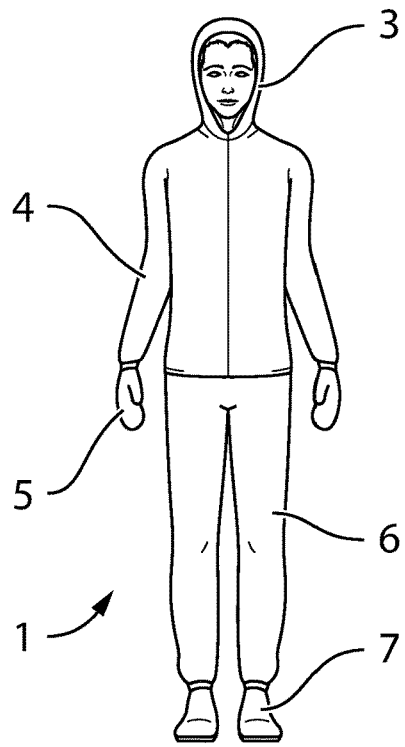
FIG. 1 is a diagrammatic representation of a person wearing apparel, footwear and headgear with a reflective metalized polymeric insulation material according to the invention.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "bonded," and "melded," and variations thereof herein are used broadly and encompass direct and indirect connections, bondings, and meldings. In addition, the terms "bonded" and "melded" and variations thereof are not restricted to physical or mechanical connections or couplings. Additionally, unless otherwise noted, the term "metalized" is used broadly to encompass "metals" (and vice versa), such as metal foils and the like. Furthermore, and as described in subsequent paragraphs, the specific mechanical, other configurations illustrated in the drawings are intended to exemplify embodiments of the invention. However, other alternative mechanical or other configurations are possible which are considered to be within the teachings of the instant disclosure.

FIG. 1 shows generally at 1, a person, wearing headgear 3, jacket 4, gloves 5, trousers 6 and boots 7 lined with a reflective metalized polymeric insulation material according to the invention.

Figure 2:
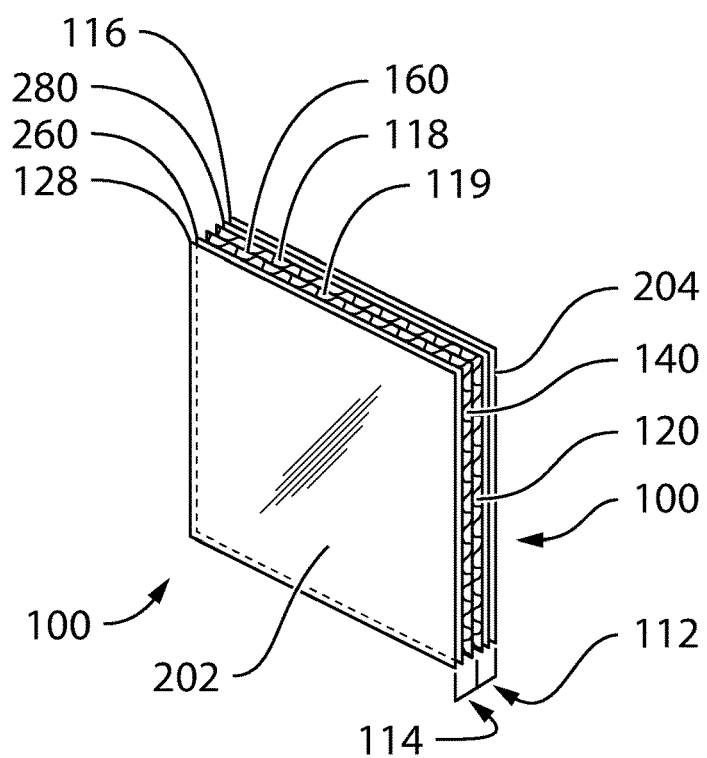
FIG. 2 is a diagrammatic perspective view of an article (in part) according to the invention.

With reference to FIG. 2, this shows generally as 100, a double layer, bubble-pack with an aluminum foil insulation assembly, thus forming a radiant barrier, adhered between the outer skin 202 and inner lining 204 of a jacket material. The double layer consists of a pair of bubble pack arrays 112, 114 bonded together through an intervening low-density polyethylene film 160. Arrays, 112, 114 are formed of a plurality of bubbles 119 or sealed cavities and spaces between the bubbles 118, from a 5-mil polyethylene film 116, 128, respectively. Each of films 116, 128, at their outer surfaces, is bonded to a reflective metal foil or reflective aluminum foil 260, 280, respectively, to provide the whole assembly with external aluminum surfaces.

Assembly 100 has approximately twenty, 1 cm diameter, 0.5 cm high bubbles per 30 cm length and breadth, given unit, within each of films 220, 240.

Figure 17:
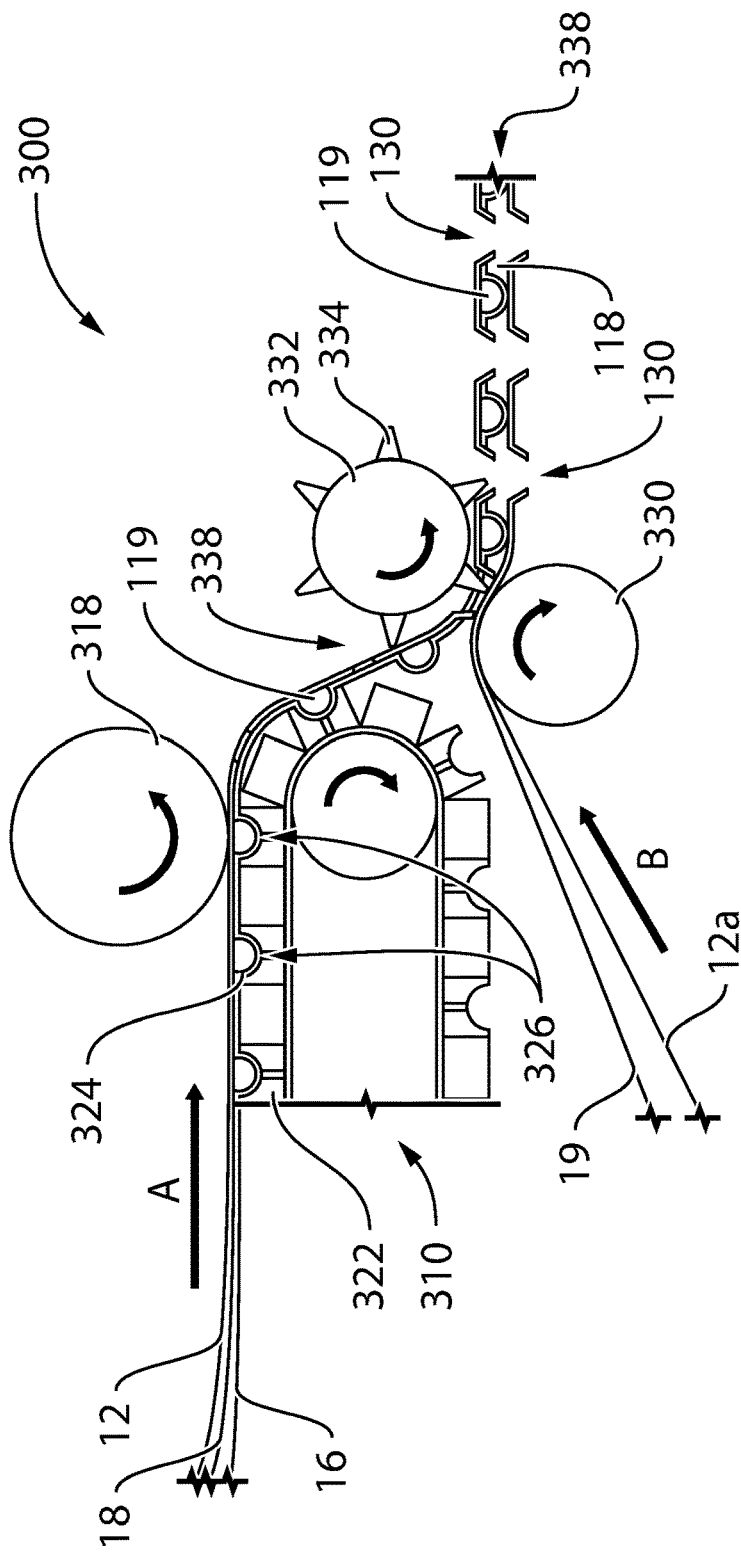
FIG. 17 is schematic side view of an exemplary apparatus for producing the reflective metalized insulation bubble pack assembly.

The aforesaid assembly 100 is made by a double hot roller thermal and vacuum forming process for cavity forming and lamination sealing techniques known in the art. Furthermore, a device for such a thermal and vacuum forming process is shown in FIG. 17, generally at 300, and is discussed below.

Figure 3:
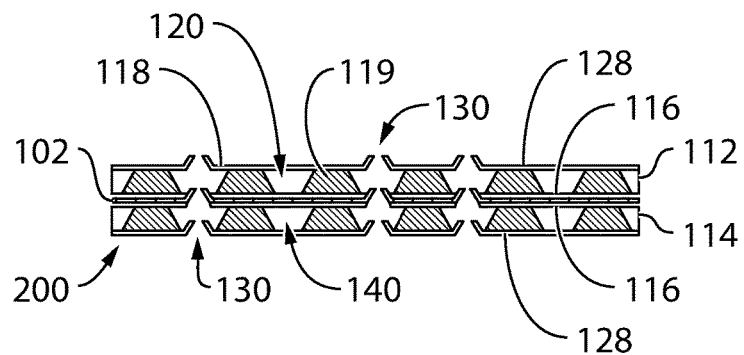
FIGS. 3 and 4 are diagrammatic cross-sectional views through a reflective metalized insulation bubble pack having an interposed aluminum foil or metalized polymeric film with apertures for use in the practice of the invention.

With reference to FIG. 3, this shows generally at 200 a composite double bubble-pack assembly, thus forming a radiant barrier, according to the invention, having a metal or aluminum foil 102 disposed between and bonded to bubble arrays 112 and 114 formed as for example the assembly shown in FIG. 2. Bubble layers 120 and 140 are encapsulated between polyethylene films 116 and 128, thus forming exemplary arrays. Apertures 130 are provided as interposed between the bubbles. For example, the apertures 130 may be provided so as to extend through spaces 118 between bubbles 119 and the aluminum foil 102. In some embodiments, such as that shown in FIG. 21c for example, the apertures 130 may be made through a certain number of the bubbles 119. In such an embodiment, the apertures 130 are pierced through both sides of the bubbles 119 such that moisture vapour may pass therethrough. However, the number of apertures 130, the size of the aperture and the array pattern of the apertures provided in various embodiments is dependent on the desired moisture transference across the apertures.

Figure 4:
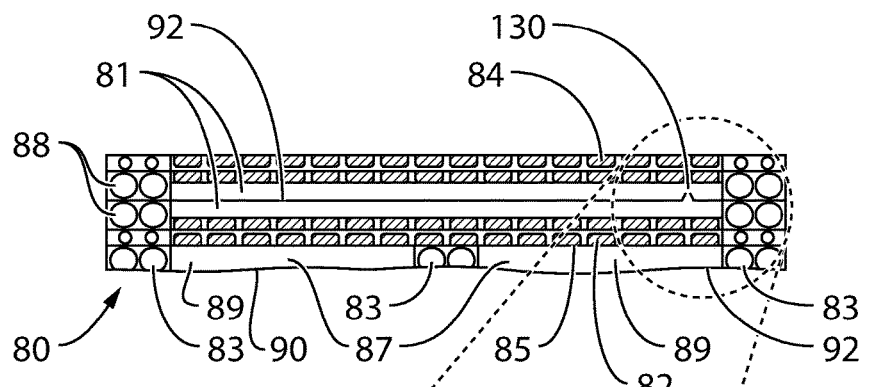
Figure 21A:
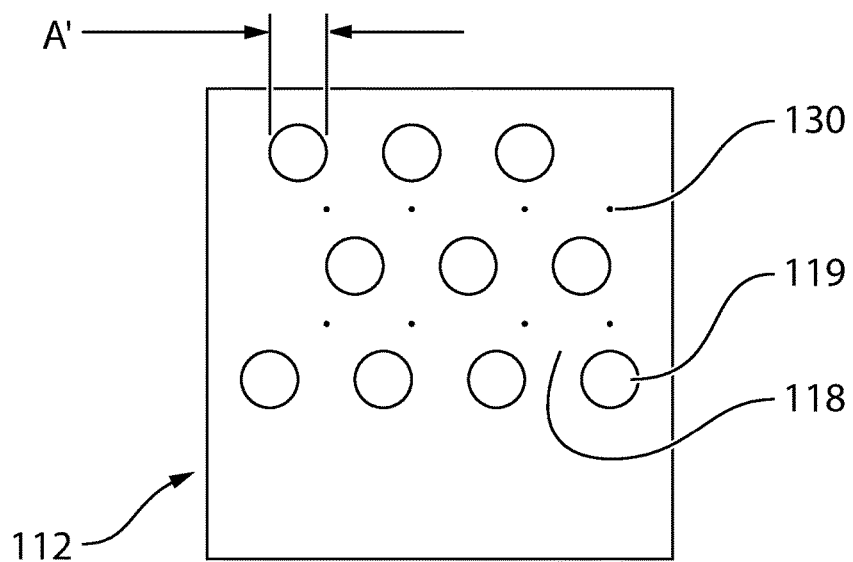
FIGS. 21a to 21c are diagrammatic top plan views of exemplary configurations of apertures located in various exemplary embodiments of the insulative bubble packs of the instant disclosure.
Figure 21B:
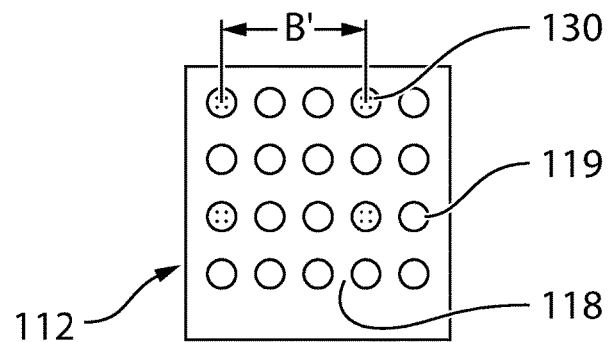
Figure 21C:
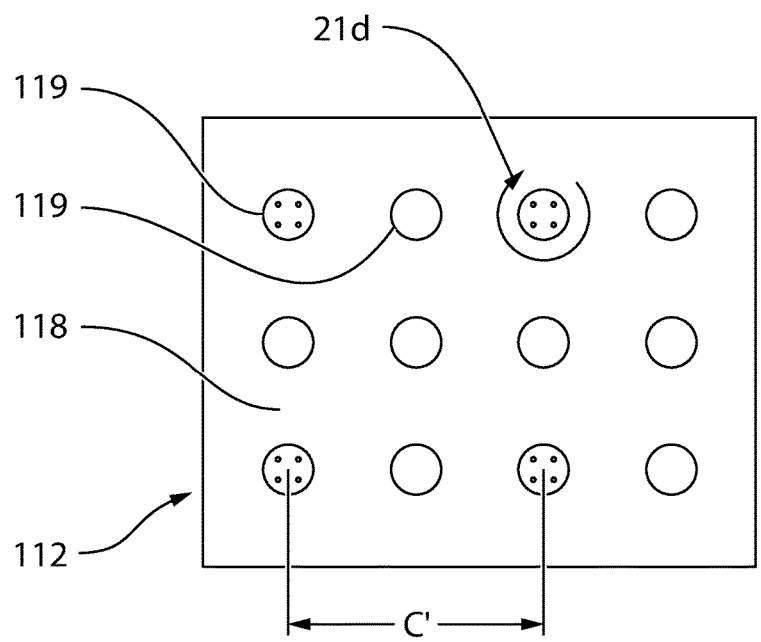
Figure 21D:
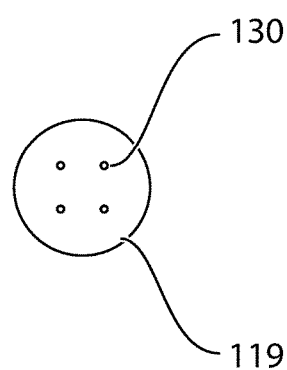
FIG. 21d is an exploded diagrammatic top plan view of a portion of FIG. 21c showing apertures located through a bubble.

For example, the apertures are provided as a frusto-conical shape so as to substantially provide one-way moisture transference; that being more moisture egress than ingress across the insulative layer. In such instances the larger open end of the frusto-conical aperture, as shown in FIGS. 3, 4, and 21c, for example, is oriented proximal the interior of an article of clothing (also shown in FIG. 18) or insulative casings. The smaller open end of the frusto-conical aperture is thus oriented toward the exterior of the article of clothing (in some aspects disclosed herein, the insulative casings or sleeping bags) or distal the mammal in use. In providing frusto-conical apertures orientated relative a wearer of the article of clothing or insulative casing such as in a sleeping bag embodiment, a substantially one-way moisture vapour transference aperture is provided.

Aluminum foil 102 has a low emissivity value of less than 5% on each surface to essentially eliminate heat transfer by radiation thus making it desirable for use in the reflective metalized polymeric insulative layer.

Each of the single bubble-pack layers 112, 114 provides both thermal conduction and convection insulation, and, in combination with the aluminum surfaces, excellent radiation insulation.

The composite bubble-pack 100 offers significant resistance to heavy loading whereby appreciative non-breakage of the air bubbles is often found. Preferably, outer layers 128 are made slightly thicker than inner layers 116 to better resist abrasion. Additional water resistance or abrasion resistant films may be bonded, formed or laminated to layer 128.

Further, in consequence that the composite assemblies of the instant disclosure may have better thermal R-values than prior art assemblies, thinner or higher insulative assemblies may be provided.

FIG. 4 shows a bubble pack generally as 80 having a pair of insulative air chambers 81 created by inner spacers 88 laminated to individual bubble packs 82, 84.

The assembly of FIG. 4, for example, also has a plurality of external spacers 83 adhered to outer layer 85 to define with layer 85 open cavities 87, which when adhered or sewn to an inner or outer lining 90 of an article provides a sealed insulative air chamber 89 from open cavities 87 between the bubble pack assembly 80 and lining 90. Assembly 80 has a pair of aluminum laminate or metalized films 92 adhered together. Additionally, in such an embodiment as shown in FIG. 4, frusto-conical apertures 130 as described above may also be provided so as to extend across the pair a metalized films 92 such that the inner insulative air chambers 89 are thus placed in in fluid communication.

Figure 4A:
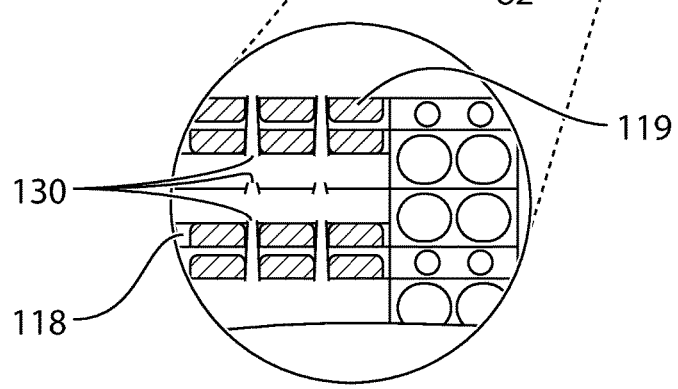
FIG. 4a is an exploded diagrammatic cross-sectional view of a portion of FIG. 4 showing insulative air chamber apertures.

Furthermore, with reference to FIG. 4, in particular the exploded view portion, FIG. 4a, of an exemplary insulative assembly, the location of the frusto-conical insulative air chamber apertures 130 are shown in alignment interposed in the spaces 118 between bubbles 119.

With reference to FIGS. 5 to 16 the following numerals denote the same materials throughout the drawings, as follows with reference to various exemplary metalized bubble-pack insulative layer arrangement's:

12—48 gauge aluminum metalized polyester (PET) film;
14—adhesive;
16—1.2 ml polyethylene film;
18—2.0 ml polyethylene film (bubbled);
19—fabric layer
20—1.2 ml ethylene vinyl acetate-polyethylene film;
22—2.0 ml polyethylene film;
24—aluminum foil;
26—polyester scrim; and
130—aperture.

Figure 5:
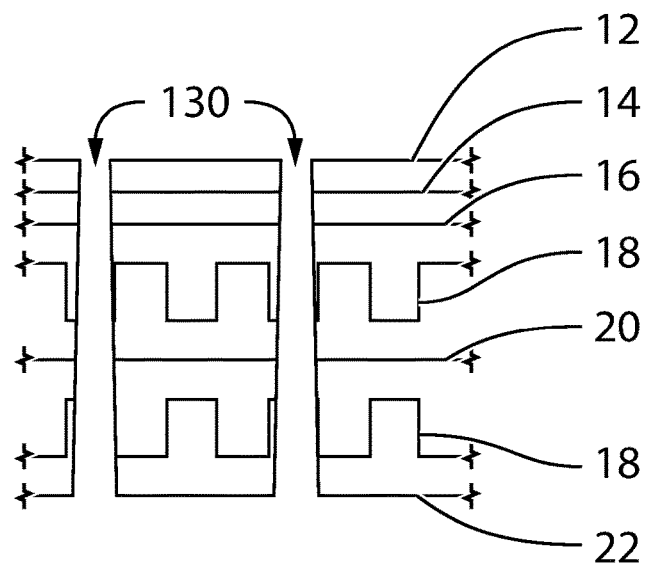
FIGS. 5 to 16 represent diagrammatic, exploded sectional views of bubble pack assemblies of use in the practice of the invention; and wherein the same numerals denote like parts.
Figure 6:
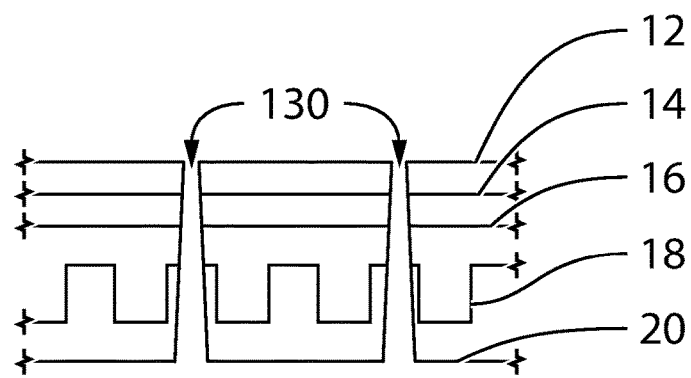
Figure 7:
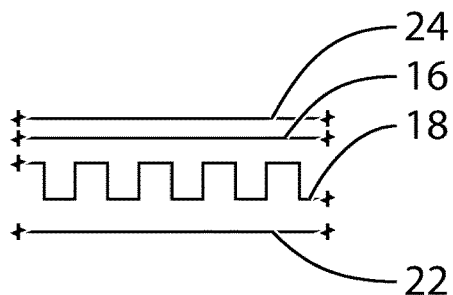
Figure 8:
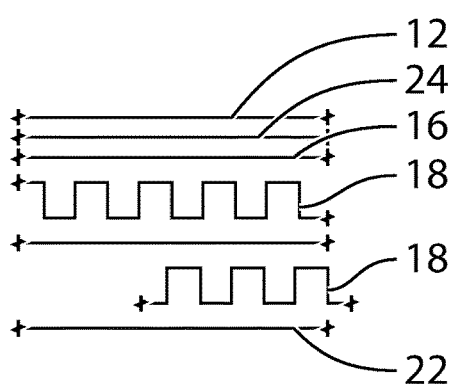
Figure 9:
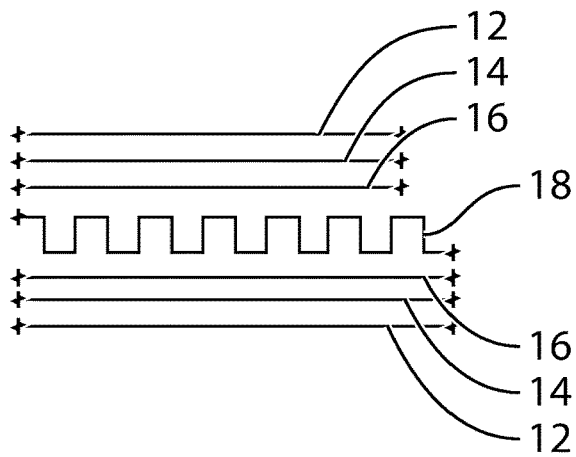
Figure 10:
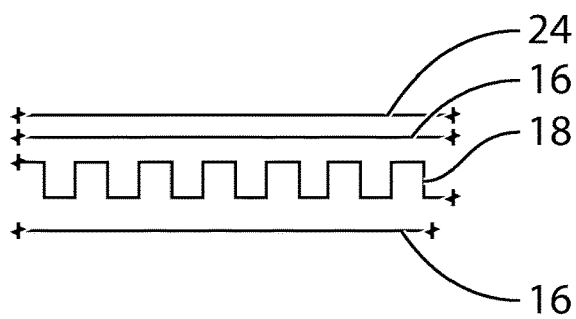
Figure 11:
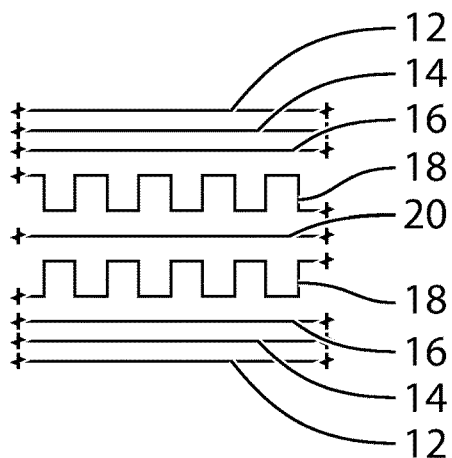
Figure 12:
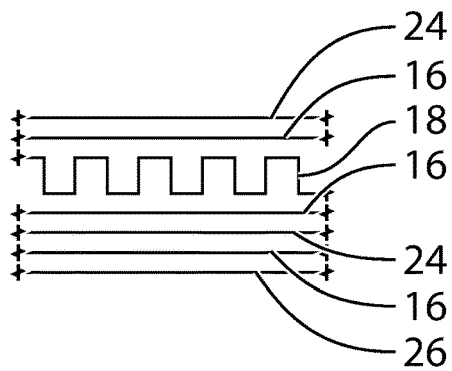
Figure 13:
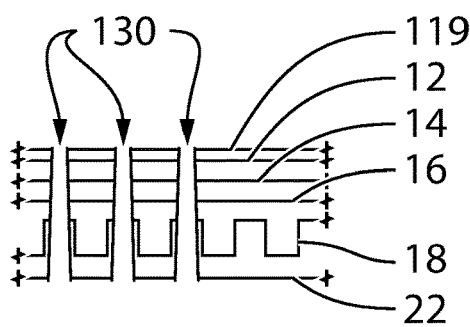
Figure 14:
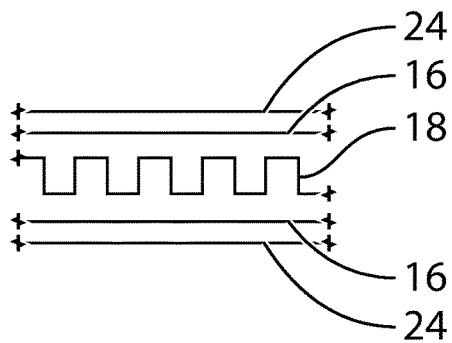
Figure 15:
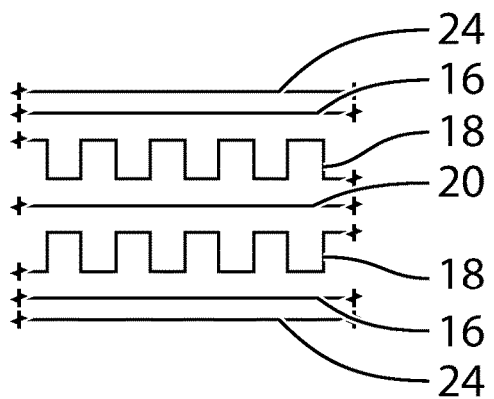
Figure 16:
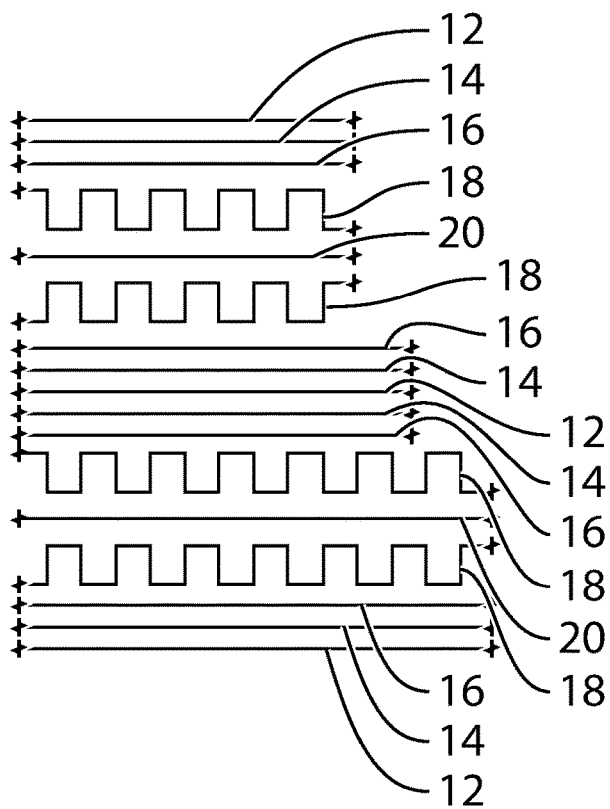

FIGS. 5, 6 and 13 show exemplary frusto-conical apertures 130, in exemplary arrangements. It should be noted that FIGS. 5 to 16 are provided for the purposes of detailing exemplary arrangements of the layers comprising the insulative assembly. Although not shown in all figures, apertures are placed, as noted above interposed between the bubbles so formed so as to allow the substantially one-way passage of moisture vapour across the insulative assembly. Additionally, in some embodiments, so as to attain a desired number of apertures for certain applications, a portion of bubbles 119 may be pierced on both sides so as to increase the number of apertures 130 per unit area of the bubble pack and reduce the number of insulative intact bubbles and thus allow substantially one-way moisture vapour transference.

The bubble pack layer is preferably of a thickness selected from 0.5 cm to 1.25 cm. The other polyethylene layers are each of a thickness, preferably, selected from 1 to 6 mls.

In another aspect of the disclosure, there is provided an exemplary apparatus for producing reflective metalized polymeric insulation materials having apertures for the substantially transference of moisture vapour therethrough. Furthermore, the apertures 130 are formed so as to provide substantially a one-way moisture vapour transference passage. With reference to FIG. 17, there is provided an exemplary apparatus for producing the reflective metalized polymeric insulation material, for example, that shown in FIG. 9, although in the absence of the adhesive layer 14, which may be optional. The apparatus, generally shown at 300, has an endless movable conveyor mold shown generally as 310 into which a sheet of metalized polyester 12, a first sheet of polyethylene film 16 and a second sheet of polyethylene film 18 are fed in a layered arrangement and move in the direction as shown by A. A preheater (not shown) softens the first sheet or layer of polyethylene film 16, and in some instances the second sheet or layer of polyethylene film 18 to just below the melt temperature thereof, for example, 136° C. to 140° C. for polyethylene, so as to allow bonding of layers. The molds 310, made, in some instances from aluminum, have a plurality of spaced apart elongate members 322 movable by means of terminal rotating cog and sprocket assemblies (not shown). Each of the members 322 has portions defining semi-spherical cavities 324 intermittent along the width of the member 322 and, in some instances, offset to adjacent cavities 324 on adjacent members 322. Each of the cavities 324 has a passage 326 to provide suctional forces on the softened film for pulling the film under suction onto the inside of the cavity surface, by way of a vacuum pump (not shown).

A first nip roller 318 is located to apply pressure so as to bond and complete the sealing of the metalized polyester film 12 to the first sheet of polyethylene film 16 and also seal the first sheet of polyethylene film 16 to the second sheet of polyethylene film 18 once the bubbles 119 are formed, thus forming an intermediate portion of the reflective metalized polymeric cavity-filled bubble insulation assembly 338 with enclosed bubbles 119.

The size, shape and arrangement of the cavities or bubbles 119 in the films may be as suitably determined by the skilled person. Furthermore, the temperatures used to soften the polymeric films 16 and 18 as well as the film throughput rate can be readily selected by the skilled person, however throughput rates of about 50 meters/minutes are preferred in some embodiments.

Once the intermediate portion of the reflective metalized polymeric cavity-filled bubble insulation assembly 338 is formed, as described for exemplary purposes above, a third sheet or layer of polymeric film 19 and metalized polyester 12a are applied to the curved side of the bubbles 119. The third layer of polymeric film 19 and a second metalized polyester sheet or layer 12a enter the system substantially as shown in FIG. 17 and move in the direction shown at B. A second nip roller 330 applies pressure so as to bond the third layer of polyethylene film 19 having adhered thereto the second layer of metalized polyester film 12a to the curved side of the bubble 119. At this stage preheater (not shown) may be used, similar to that as noted above, to soften the polyethylene film 19, or films 16, 18 and 19, to just below the melt temperature thereof, for example, 136° C. to 140° C., for polyethylene, such that the metalized polyester 12a may be adhered thereto and also to aid in adhering the polymeric film 19 to the curved side of the bubbles 119. Once the third polymeric film layer 19 and the second metalized polyester layer 12a are adhered, the reflective metalized polymeric cavity-filled bubble insulation assembly 338 is completed, in the exemplary embodiment noted herein.

In order to form the apertures 130 between in the spaces 118 interposed between the bubbles 119, an aperture-forming roller 332 is provided. In some instances the aperture-forming roller 332 is provided for co-operation with the second nip roller 330 wherein a degree of pressure is provided between the second nip roller 330 and the aperture-forming roller 332. The aperture-forming roller 332 has a plurality of projections 334, which may be heated, provided at locations about the circumference thereof for making apertures 130 through at least some of the spaces 118. Although not shown, in some embodiments, the projections may be aligned to pierce a portion of the bubbles. However, in preferred embodiments the projections 334 are provided as non-heated, needle-like projections which pierce through the layers of the reflective metalized polymeric cavity-filled bubble insulation assembly 338 to provide apertures 130, as shown in FIG. 17. The needle-like projections 334 are preferred because when the projection pierces the reflective metalized polymeric cavity-filled bubble insulation assembly 338 at the location of the spaces 118 interposed between bubbles 119, substantially frusto-conical apertures 130 are formed. Such frusto-conical apertures are preferred owing the property of being able to provide a substantially one-way moisture vapour transference when the reflective metalized polymeric cavity-filled bubble insulation assembly 338 is utilized in an article of clothing or other product requiring substantially one-way moisture vapour transference.

With specific reference to the apparatus 300 shown in FIG. 17, the endless molds shown 310, the first nip roller 318, the second nip roller 330, and the aperture forming roller 332 move in a synchronized fashion such that as the reflective metalized polymeric cavity-filled bubble insulation assembly 338 is produced, the projections 334 are aligned with the spaces 118 interposed between the bubbles 119 so as to form the apertures 130, while not piercing bubbles.

Figure 18:
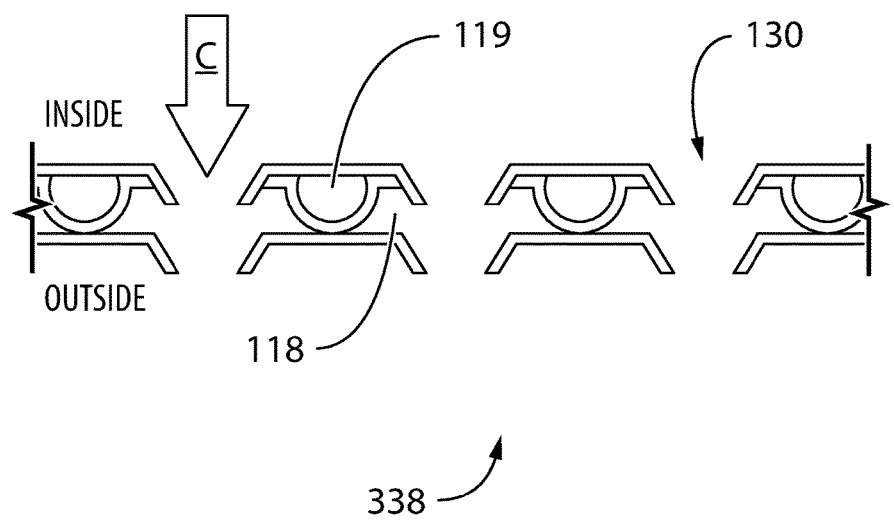
FIG. 18 is a schematic side view of section of an exemplary reflective metalized polymeric cavity-filled bubble insulation assembly having apertures formed therein.

As shown schematically in FIG. 18, a sectional side view of a formed section of reflective metalized polymeric cavity-filled bubble insulation assembly 338 is provided. In an article of clothing, the reflective metalized polymeric cavity-filled bubble insulation assembly or radiant barrier 338 is oriented such that the inside, as shown in the figure is oriented towards the wearer and the outside is oriented toward the elements. In such an orientation, the larger opening of the frusto-conically shaped apertures 130 is thus oriented toward the inside of an article of clothing. Moisture vapour is therefore permitted to pass through apertures 130 along a path denoted by the arrow C. Owing to the frusto-conical shape, the passage of moisture is allowed to pass through the apertures in substantially one direction only thereby reducing dampness from the wearer's perspiration inside the garment. Also, the frusto-conical shape of the apertures reduces the transference of air, and vapours contained therein, from the outside of the garment to the inside of the garment, thus providing a net insulative effect with means to allow moisture vapour to escape from inside the article of clothing.

Figure 19:
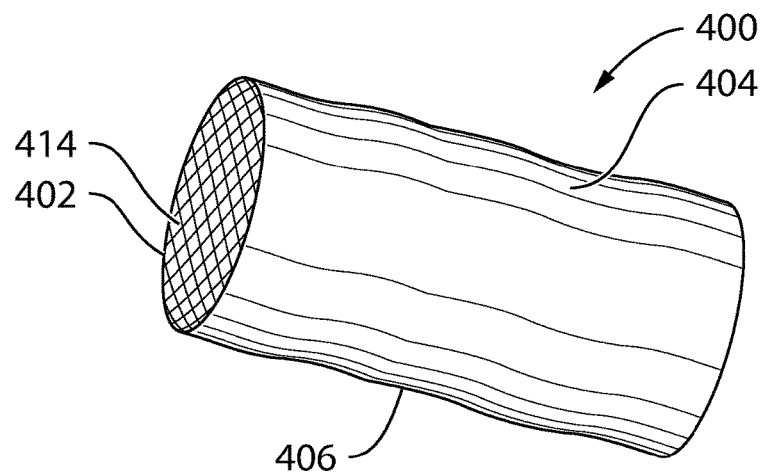
FIG. 19 is schematic perspective view of an embodiment of a thermally insulative casing.

Turning now to the aspect and embodiments shown in FIGS. 19 to 20b in particular, a thermally insulative casing 400 is hereinbelow described. The thermally insulative casing 400 is comprised of a first rectangular portion 402 and second rectangular portion 404. In accordance with the disclosure provided above, the first rectangular portion 402 and the second rectangular portion 404 are prepared using the reflective metal or metalized polymeric insulation materials provided herein and described above. Additionally, in some embodiments, the reflective metal or metalized polymeric insulation materials are devoid of apertures such as described in U.S. Pat. Nos. 6,322,873 and 6,562,439 and Canada Patent number 2,554,754. For example, both the first rectangular portion 402 and the second rectangular portion 404 may comprise a reflective metal polymeric bubble pack insulation assembly having a plurality of bubbles or a reflective metal multilayer film insulation assembly. A reflective side 418 (FIG. 20a) of the reflective metal insulation assemblies is, in preferred embodiments, oriented to face the interior of the thermally insulative casing 400 so as eliminate, or at least reduce heat transfer by radiation outside of the thermally insulative casing 400. Furthermore, in some embodiments, the first rectangular portion 402 and the second rectangular portion 404 may be covered by a fabric mesh 414 over the reflective side 418 (shown in FIG. 19) such that the fabric mesh 414 may absorb at least some perspiration given off by a user of the thermally insulative casing 400 when received therein and also to enhance user comfort. Such a fabric mesh 414 will have a mesh size sufficient to expose portions of the reflective side 418.

Although not shown in the figures for simplicity, in some embodiments, the bubbles of the first rectangular portion 402 are larger in diameter than those of the second rectangular portion 404. Therefore, in some embodiments, it may be desirable to have larger bubbles incorporated into the first rectangular portion 402. For example, in some embodiments, the bubbles of the first rectangular portion 402 may have diameter of greater than ½" and a height of greater than ³⁄₁₆" and bubbles of the second rectangular portion 404 may have a diameter of less than ½" and a height of less than ³⁄₁₆". In preferred embodiments, the bubbles of the first rectangular portion 402 have a diameter of about 1" and a height of about ½" and the bubbles of the second rectangular portion 404 have a diameter of about ¼" and a height of about ³⁄₁₆".

The first rectangular portion 402 and the second rectangular portion 404 of the thermally insulative casing 400 may be integrally formed, in some embodiments. For example the first rectangular portion 402 and the second rectangular portion 404 meet and are joined along edge 406, as shown in FIG. 19. In other embodiments of the thermally insulative casing 400, the first rectangular portion 402 and the second rectangular portion 404 may be adjacently joined to one another along edge 406 by some means, for example by way of taping, stitching or otherwise being coupled. Additionally, the first rectangular portion 402 and the second rectangular portion 404 may be adjacently joined by way of an adjoining fabric medium. For example, a fabric insulating coupling medium may be used as the adjoining fabric medium to couple the first rectangular portion 402 in position relative to the second rectangular portion 404 where fabric insulating medium forms element 406. The fabric coupling medium may be an insulating medium.

Figure 20A:
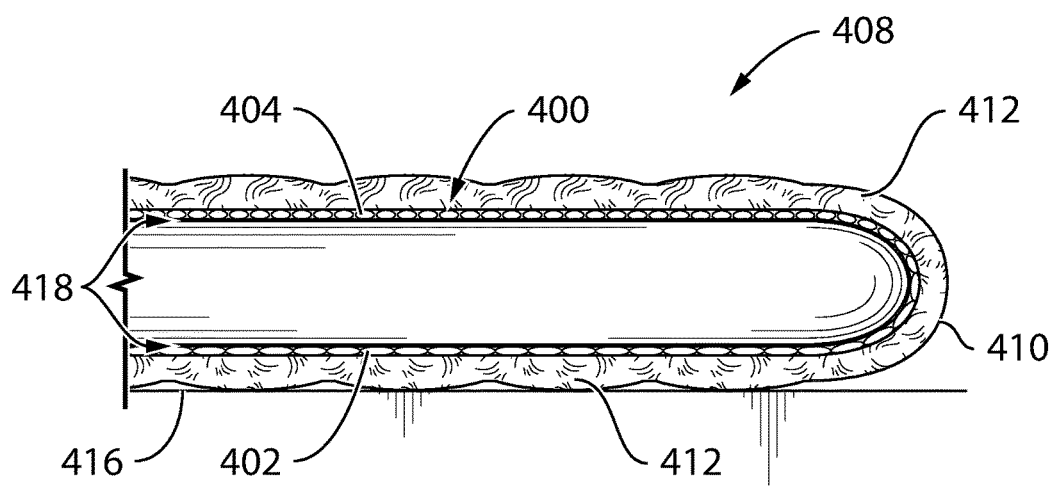
FIG. 20a is a schematic cut-way side of an embodiment of the thermally insulative casing of FIG. 19 provided interior of a rectangular enclosure.

In other embodiments, the first rectangular portion 402 may be inserted and maintained in position by some means in a rectangular enclosure 410, as shown for example in FIG. 20a, relative to the second rectangular portion 404. Also, the fabric mesh 414, noted above, may be used to formed pockets (not shown) to receive therein the first rectangular portion 402 and the second rectangular portion 404, respectively, so as maintain each in position in the rectangular enclosure 410. In such an embodiment where the first rectangular portion 402 and the second rectangular portion 404 are maintained in a rectangular enclosure 410, the insulating medium may be provided between the first rectangular portion 402 and the second rectangular portion 404 as part of the rectangular enclosure 410.

The rectangular enclosure 410 may be provided as a sheath, for example an outer fabric layer, suitable for receiving therein the thermally insulative casing 400. Additionally, in some embodiments, as indicated above, the first rectangular portion 402 and the second rectangular portion 404 may be coupled to the rectangular enclosure 410 once received therein thereby maintaining each in a desired position relative to one another. In some embodiments, the rectangular enclosure 410 is provided as a sleeping bag assembly 408 wherein when the first rectangular portion 402 and the second rectangular portion 404 are received therein and not coupled to one another directly, thus portions of the sleeping bag assembly 408 providing the insulating medium between the first rectangular portion 402 and the second rectangular portion 404. Furthermore, in cases where the thermally insulative casing 400 is received in a sleeping bag assembly 408, either as a retro-fit liner or as part of the sleeping bag manufacturing process, there may be, in some embodiments, a thermal insulation layer 412 provided between the thermally insulative casing 400 and the rectangular enclosure 410. The thermal insulation layer 412 in such embodiments, may be provided as a down insulation, a polymeric insulation, a fleece insulation, a natural fibre insulation, a glass fibre insulation or any other suitable form of thermal insulation.

Figure 20B:
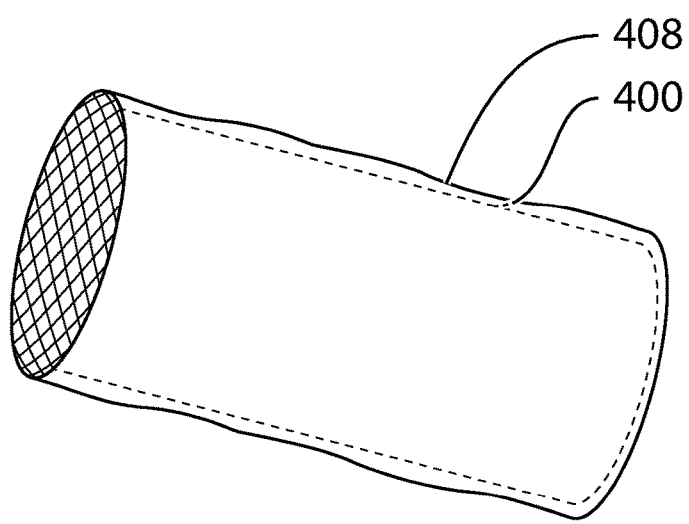
FIG. 20b is perspective view of FIG. 20a showing the thermally insulative casing, in ghost, located inside of the rectangular enclosure.

Additionally, in embodiments noted above, for example, when the first rectangular portion 402 and the second rectangular portion 404 are integrally formed or adjacently coupled along edge 406, the resultant thermally insulative casing 400 may form a liner for a sleeping bag assembly 408, as shown for example in FIG. 20b. Such a liner may be provided as a retro-fit liner for a sleeping bag assembly 408 or manufactured therein as part of a newly formed sleeping bag assembly 408. Furthermore, the resultant thermally insulative casing 400, when the first rectangular portion 402 and the second rectangular portion 404 are integrally formed or adjacently joined to one another long edge 406, may in and of itself form a sleeping bag. In such an embodiment, one end of the insulative casing 400 may be sealed, thus forming a single closed-ended tube suitable for receiving therein a mammal.

Turning now to FIG. 20a, an exemplary embodiment is shown wherein the insulative casing 400 is provided in a rectangular enclosure 410. In the exemplary embodiment shown in FIG. 20a, for purposes of further describing preferred embodiments, the first rectangular portion 402 may also be termed a lower portion. The lower portion 402, in use of the insulative casing 400 is oriented towards the ground 416. The second rectangular portion 404, accordingly, may thus be termed an upper portion, which as shown in the FIG. 20a is consequently oriented upward relative the lower portion 402, during use.

Continuing with reference to FIG. 20a, the lower portion 402, in a preferred embodiment, is formed from a reflective metal or metalized polymeric insulation material or reflective metal or metalized polymeric insulation bubble pack assembly. Although not shown in FIG. 20a for simplicity, the upper portion 404 is formed from a reflective metal polymeric bubble pack insulation assembly having a plurality of bubbles or a reflective metal multilayer film insulation assembly. The upper portion 404, in such a preferred embodiment has a plurality of apertures 130 formed therein. Such a reflective metal polymeric bubble pack insulation assembly having a plurality of bubbles or a reflective metal multilayer film insulation assembly having a plurality of apertures is described above. Briefly, the reflective metal polymeric bubble pack insulation assembly of the upper portion 404, in preferred embodiments, includes a plurality of apertures 130 provided in an effective number and array so as to allow effective moisture transference. For example, bubble pack insulation assemblies such as those shown in FIGS. 3 to 16 and described above may be utilized for the upper portion 404. The apertures are thus suitably sized and located so as to effect transference of moisture vapour through the apertures from interior the thermally insulative casing 400 without substantial ingress of external air through the apertures so as to provide a net insulative effect. Therefore, in preferred embodiments, the upper portion 404 is provided with apertures to allow the egress of moisture vapour from interior of the thermally insulative casing 400, thus forming a breathable or, in other words a moisture vapour pervious insulative layer, while, the lower portion 402 to be located adjacent the ground 416 in use, is devoid of apertures thus providing a non-moisture pervious insulative barrier against the ground 416. For example, in some embodiments, the apertures are provided, as noted above, in such a number and array so as to allow from about 0.020 to about 0.040 perms (gr/ft$^2$·h·(in.Hg) and from about 0.0085 to about 0.0200 Water Vapour Transmission (gr/h·ft$^2$), when tested accordingly the protocols of the ASTM test Method E 96-05. In preferred embodiments, the apertures are provided such a number and array so as to allow 0.027 perms. Additionally, the apertures may be provided in preferred embodiments, so as to form, on the average, about 25 apertures/in$^2$ while maintaining the preferred 0.0207 perms.

According to various embodiments, envisioned and disclosed herein, the number, array and size of the apertures 130 is dependent on the desired moisture vapour transference and the required insulating properties of an item made using the bubble packs disclosed herein. For example, FIGS. 21a to 21c show various exemplary embodiments and aperture 130 patterns in bubble packs having about 0.47 cm (3⁄16") diameter bubbles. Of course, for various applications, bubble packs having larger or smaller bubble sizes may be used. FIG. 21a shows a bubble pack having bubbles 119 of about 0.47 cm (3⁄16") defined by A'. In this embodiment, apertures 130 are made in the spaces 118 interposed between the bubbles 119. In FIG. 21b, the same bubble pack as is FIG. 21a is shown, however, four apertures 130 are shown being located in pattern of every two bubbles 119 wherein the bubbles have apertures 130 which have been pierced through on both sides so as to allow moisture vapour transference (see FIG. 21e). The spacing between the pierced bubbles as shown in FIG. 21b is shown at B' and is about 4.45 cm (1¾"), on centre. Similarly, FIG. 21c shows a bubble pack with four apertures 130 located in every other bubble, thus having a spacing of C' of about 2.15 cm (⅞"). Although only four apertures 130 are shown in the bubbles 119 in FIGS. 21b and 21c, and one aperture 130 interposed between the bubbles 119 in FIG. 21a for simplicity and purposes of illustration only, more or less apertures may be provided depending on the desired application and spacing available so as to produce the number of apertures and desired moisture vapour transference. Furthermore, the size of the frusto-conical apertures 130 may be from about 0.3 mm (1⁄64") to about 1.5 mm (1⁄16") and preferably, about 0.79 mm (1⁄32"). Such aperture sizes are provided for the exemplary purposes only and one of skill in the art may realize that different aperture sizes may be required or desired depending on a given application and the desired amount of moisture vapour transference.

EXAMPLES

Samples of the thermally insulating reflective metalized polymeric insulation material having apertures therein were tested to determine air permeance, water pressure withholding and water vapour permeance. Given that a thermally insulating reflective metalized polymeric insulation material is non-porous, no air, water or water vapour will pass therethrough until apertures, such as in various embodiments of the instant disclosure, are formed therein. Accordingly, the tested embodiments of the thermally insulating reflective metalized polymeric insulation material having apertures formed therein are shown in the figures. FIG. 6 shows schematically a cut-away side view of an exemplary embodiment of the thermally insulating reflective metalized polymeric insulation material having apertures form therein used in the testing process. With regard the aperture pattern and number of apertures specifically, FIGS. 21a to 21c schematically show the tested embodiments in the following examples where, samples A1 to A3 correspond to the embodiment shown in FIG. 21a, samples B1 to B3 correspond to the embodiment shown in FIG. 21b and samples C1 to C3 correspond to the embodiment shown in FIG. 21c. The average size each aperture was about 0.79 mm (1⁄32").

Example 1

The samples noted above were tested using the ASTM D737 (2012) test for Air Permeability of Textile Fabrics. Briefly, this standardize test is used to measure the air permeability of textile fabrics and can also be applied to woven fabrics, nonwoven fabrics, air bag fabrics, blankets, napped fabrics, knitted fabrics, layered fabrics, and pile fabrics. The fabrics may be untreated, heavily sized, coated, resin-treated, or otherwise treated.

TABLE 1

| Sample | CFM/ft$^2$ |
|---|---|
| A1 | 1.93 |
| A2 | 1.90 |
| A3 | 2.21 |
| Average A | 2.015 |
| B1 | 1.35 |
| B2 | 1.41 |
| B3 | 1.35 |
| Average B | 1.372 |
| C1 | 2.03 |
| C2 | 2.07 |
| C3 | 1.81 |
| Average C | 1.971 |

Table shows that the embodiment shown in FIG. 21a, on average has an air permeability of 2.015 Cubic Feet per minute per square foot (CFM/ft$^2$) of reflective metalized polymeric insulation material having apertures form therein, whereas the embodiments shown in FIGS. 21b and 21c on average had an air permeability of 1.37 CFM/ft$^2$ and 1.971 CFM/ft$^2$. Therefore, the data shows that more air permeability of the reflective metalized polymeric insulation material is achieved by forming the frusto-conical apertures in the spaces interposed between the bubbles as opposed to through the bubbles. Interestingly, the embodiment shown in FIG. 21a has the least number of apertures per unit area.

Example 2

The samples noted above were also tested using the AATCC 127 Water Pressure test. This standardized test measures the resistance of a fabric to the penetration of water under hydrostatic pressure. This test can be used to measure the water penetration for all type of fabrics including those treated with a water resistant or repellant finish.

TABLE 2

| Sample | mbar |
| --- | --- |
| A1 | 9.0 |
| A2 | 8.5 |
| A3 | 8.5 |
| Average A | 8.7 |
| B1 | 7.0 |
| B2 | 7.5 |
| B3 | 7.5 |
| Average B | 7.3 |
| C1 | 8.0 |
| C2 | 7.5 |
| C3 | 7.5 |
| Average C | 7.7 |

This testing data shows that the samples shown in the embodiment of FIG. 21a had the highest resistance to water penetration under pressure with an average penetration pressure of 8.7 mbar compared to an average of 7.3 mbar and 7.7 mbar for the embodiments shown in FIGS. 21b and 21c, respectively.

Example 3

The samples noted above were also tested for water vapour permeance using the ASTM test Method E 96-05. Briefly, this standardized test is used for determining the water vapor transmission (WVT) of materials through which the passage of water vapor may be of importance, such as paper, plastic films, other sheet materials, fiberboards, gypsum and plaster products, wood products, and plastics.

TABLE 3

| Sample | US Perms (gr/ft$^2$ · h · (in · Hg) |
| --- | --- |
| A1 | 7 |
| A2 | 7 |
| A3 | 7 |
| Average A | 7 |
| B1 | 3 |
| B2 | 3 |
| B3 | 4 |
| Average B | 3.4 |
| C1 | 5 |
| C2 | 5 |
| C3 | 5 |
| Average C | 5 |

This testing data shows that the samples shown in the embodiment of FIG. 21a had the highest water vapour permeability with an average of 7 US Perms compared to an average of 3.4 US Perms and 5 US Perms for the embodiments shown in FIGS. 21b and 21c, respectively.

Figure 21E:
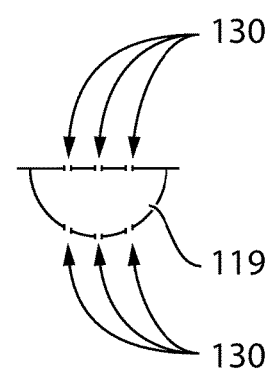
FIG. 21e is a cross-sectional view a pierced bubble of an embodiment of an insulative bubble pack of the instant disclosure.

In the three examples noted above, surprisingly, the embodiment shown schematically in FIG. 21a, that being the sample of the reflective metalized polymeric insulation material having apertures formed interposed between the bubbles had the greatest moisture vapour transference, yet also the greatest resistance to water penetration. The samples shown schematically in FIG. 21b (Sample B) and 21c (Sample C), wherein the apertures are formed by way of popping a portion of the bubbles as shown in FIG. 21e, have more apertures per unit area than that of Sample A, yet, interestingly have less air and water vapour permeance. Samples B and C were also shown to be less resistant to water penetration thus suggesting that more moisture vapour transference and breathability for reflective metalized polymeric insulation material can be achieved by forming the frusto-conical apertures in the spaces interposed between the bubbles and not through popped bubbles. It should be noted, however, that all of test sample displayed both breathability and water vapour transference.

Although this disclosure has been described and illustrated with regard to certain preferred embodiments of the invention, it is to be understood that the invention is not restricted to those particular embodiments. Rather, the invention includes all embodiments which are of functional or mechanical equivalence of the specific embodiments and features that have been described and illustrated.

What is claimed is:

1. An article having an inner article layer and an outer article layer to be worn by a mammal comprising a thermally insulating layer of a reflective metalized polymeric insulation material adjacent to at least one of said inner or outer article layers;
    said reflective metalized polymeric insulation material comprising a first bubble pack assembly including a first thermoplastic film having a plurality of portions wherein each of said portions defines a cavity and a second thermoplastic film in sealed engagement with said first film to provide a plurality of closed-cell cavities;
    said reflective metalized polymeric insulation material further characterized in having a plurality of frusto-conically shaped apertures suitably sized and interposed between said closed-cell cavities such that said apparel has the narrower dimension of each of said frusto-conically shaped apertures oriented distal to said mammal so as to effect transference of moisture vapour through said apertures from interior said article without substantial ingress of external air through the apertures, each of said plurality of frusto-conically shaped apertures being defined by a proximal opening and a distal opening with a continuous perimeter aperture wall extending therebetween, said aperture wall being substantially linear and inclined between said proximal opening and said distal opening such that said proximal opening has a greater area than said distal opening; and
    wherein within any thermally insulating layer of a reflective metalized polymeric insulation material having frusto-conically shaped apertures, the narrower dimension of each of said frusto-conically shaped apertures is oriented distal to said mammal.

2. The article as defined in claim 1, wherein said apertures allow substantially one-way moisture vapour transference.

3. The article as defined in claim 1, wherein said apertures are provided in an effective number and array so as to allow effective moisture transference.

4. The article as defined in claim 1, wherein said article is provided as apparel, a hat, a toque, muffs, gloves, boots, shoes, a coat, trousers, a vest, a waistcoat or a dress.

5. The article as defined in claim 1, wherein said apertures are also formed through a portion of said closed-cell cavities.

6. The article as defined in claim 1, wherein said reflective metalized polymeric insulation material comprises an assembly comprising said reflective metalized bubble pack; a second reflective metalized bubble pack; and a first plurality of intervening bubble spacers suitably located between said first and said second bubble packs so as to define at least one inner insulative air chamber between said first and second bubble packs.

7. The article as defined in claim 6, further including at least one insulative air chamber aperture for permitting the transference of moisture vapour across said at least one inner insulative air chamber.

8. The article as defined in claim 7, wherein said at least one insulative air chamber aperture allows substantially one-way moisture vapour transference.

9. The article as defined in claim 8, wherein said at least one insulative air chamber aperture is frusto-conically shaped.

10. A thermally insulative casing for surrounding a mammal or part thereof comprising a first rectangular portion and a second rectangular portion, said first rectangular portion and said second rectangular portion each comprising a reflective metal polymeric bubble pack insulation;
said first rectangular portion and said second rectangular portion being adjacently joined to one another;
said reflective metal polymeric bubble pack insulation including a first thermoplastic film having a plurality of portions wherein each of said portions defines a cavity and a second thermoplastic film in sealed engagement with said first film to provide a plurality of closed-cell said cavities;
at least one of said first rectangular portion or said second rectangular portion further characterized in having a plurality of frusto-conically shaped apertures suitably sized and interposed between said closed-cell cavities such that the narrower dimension of each of said frustro-concially shaped apertures is oriented distal to the mammal so as to effect transference of moisture vapour through said apertures from interior said thermally insulative casing without substantial ingress of external air through the apertures, each of said plurality of frusto-conically shaped apertures being defined by a proximal opening and a distal opening with a continuous perimeter aperture wall extending therebetween, said aperture wall being substantially linear and inclined between said proximal opening and said distal opening such that said proximal opening has a greater area than said distal opening; and
wherein within any of said reflective metal polymeric bubble pack insulation having frusto-conically shaped apertures, the narrower dimension of each of said frusto-conically shaped apertures is oriented distal to said mammal.

11. The thermally insulative casing as defined in claim 10, wherein said bubbles of said first rectangular portion are larger in diameter than said bubbles of said second rectangular portion.

12. The thermally insulative casing as defined in claim 11, wherein said bubbles of said first rectangular portion have diameter of greater than ½" and a height of greater than 3/16".

13. The thermally insulative casing as defined in claim 11, wherein said bubbles of said second rectangular portion have a diameter of less than ½" and a height of less than 3/16".

14. The thermally insulative casing as defined in claim 10, wherein said first rectangular portion and said second rectangular portion are integrally formed.

15. The thermally insulative casing as defined in claim 10, further comprising an insulating medium located between said first rectangular portion and said second rectangular portion.

16. The thermally insulative casing as defined in claim 10, wherein said thermally insulative casing is a liner for a sleeping bag.

17. The thermally insulative casing as defined in claim 10, wherein said thermally insulative casing is suitably retained in a rectangular enclosure.

18. The thermally insulative casing as defined in claim 10, wherein said first rectangular portion constitutes a lower portion, and said second rectangular portion constitutes an upper portion, said lower portion being oriented towards the ground in use.

19. The thermally insulative casing as defined in claim 18, wherein said upper portion is characterized in having said plurality of apertures.

20. The thermally insulative casing as defined in claim 10, wherein a reflective side of said reflective metal polymeric bubble pack insulation assembly or said reflective metal multilayer film insulation assembly is oriented to face the interior of said thermally insulative casing.

21. The thermally insulative casing as defined in claim 19, further comprising a second reflective metal polymeric bubble pack in communication with said reflective metal polymeric bubble pack insulation; and a first plurality of intervening bubble spacers suitably located between said first and said second reflective metal polymeric bubble packs so as to define at least one inner insulative air chamber between said first and second reflective metal polymeric bubble packs.

22. The thermally insulative casing as defined in claim 21, said reflective metal polymeric bubble pack insulation assembly further including at least one insulative air chamber aperture for permitting the transference of moisture vapour across said at least one inner insulative air chamber.

23. The thermally insulative casing as defined in claim 10, further comprising a fabric mesh layer lining the interior of said thermally insulative casing.

24. A sleeping bag assembly including a thermally insulative casing for surrounding a mammal or part thereof, said thermally insulative casing comprising a first rectangular portion and a second rectangular portion, said first rectangular portion and said second rectangular portion each comprising a reflective metal polymeric bubble pack insulation;
said first rectangular portion and said second rectangular portion being adjacently joined to one another;
said reflective metal polymeric bubble pack insulation including a first thermoplastic film having a plurality of portions wherein each of said portions defines a cavity and a second thermoplastic film in sealed engagement with said first film to provide a plurality of closed-cell cavities;
at least one of said first rectangular portion or said second rectangular portion further characterized in having a plurality of frusto-conically shaped apertures suitably sized and interposed between said closed-cell cavities such that the narrower dimension of each of said frustro-concially shaped apertures is oriented distal to the mammal so as to effect transference of moisture vapour through said apertures from interior said thermally insulative casing without substantial ingress of external air through the apertures, each of said plurality of frusto-conically shaped apertures being defined by a proximal opening and a distal opening with a continuous perimeter aperture wall extending therebetween, said aperture wall being substantially linear and inclined between said proximal opening and said distal opening such that said proximal opening has a greater area than said distal opening; and wherein within any of said reflective metal polymeric bubble pack insulation having frusto-conically shaped apertures, the narrower dimension of each of said frusto-conically shaped apertures is oriented distal to said mammal.

25. The sleeping bag assembly as defined in claim 24 further comprising an outer fabric layer covering the thermally insulative casing.

26. The sleeping bag assembly as defined in claim 25, further comprising a thermal insulation layer located between the outer fabric layer and the thermally insulative casing, said thermal insulation layer being provided as a down insulation, a polymeric fibre insulation, a fleece insulation, a natural fibre insulation or a glass fibre insulation.

* * * * *